United States Patent [19]

Sweeney

[11] 3,951,929
[45] Apr. 20, 1976

[54] POLYACRYLATES AND WAXY RESIDUAL FUEL COMPOSITIONS THEREOF

[75] Inventor: William M. Sweeney, Wappingers Falls, N.Y.

[73] Assignee: Texaco Inc., New York, N.Y.

[22] Filed: Feb. 26, 1975

[21] Appl. No.: 553,182

Related U.S. Application Data

[62] Division of Ser. No. 250,900, May 8, 1972, Pat. No. 3,904,385.

[52] U.S. Cl................................ 526/328; 252/56; 260/28.5 R
[51] Int. Cl.² ......................................... C08F 15/16
[58] Field of Search .................... 260/86.1 E, 80.81

[56] References Cited
UNITED STATES PATENTS

| 3,238,133 | 3/1966 | Lorensen.................... | 260/86.1 E |
| 3,679,644 | 7/1972 | Van Der Meij ............... | 260/86.1 E |
| 3,869,396 | 3/1975 | Van De Kraats et al. ...... | 260/86.1 E |

Primary Examiner—Harry Wong, Jr.
Attorney, Agent, or Firm—T. H. Whaley; C. G. Ries; Robert A. Kulason

[57] ABSTRACT

An interpolymeric poly(n-alkylacrylate) of a molecular weight between about 3000 and 100,000 wherein said alkyl is of at least 18 carbons and at least 70 wt. % of said alkyl is of between 20 and 24 carbons inclusively, the $C_{20}$ to $C_{24}$ alkyl group consisting of between about 2 and 65 wt. % of $C_{20}$ alkyl, between about 18 and 65 wt. % $C_{22}$ alkyl, and between about 8 and 35 wt. % $C_{24}$ alkyl; and a residual petroleum fuel containing between 4 and 15 wt. % macrocrystalline paraffin wax having incorporated therein a pour depressing amount of said poly (n-alkylacrylate) wherein said poly(n-alkylacrylate) is initially introduced in said residual fuel at a temperature above the solution point of said wax.

3 Claims, No Drawings

POLYACRYLATES AND WAXY RESIDUAL FUEL COMPOSITIONS THEREOF

This is a division of application Ser. No. 250,900 filed May 8, 1972, now U.S. Pat. No. 3,904,385.

BACKGROUND OF INVENTION

This invention relates to a novel interpolymeric poly(n-alkylacrylate) pour depressor, to wax containing residual fuel oil compositions of reduced pour point containing said pour depressor and to making greater utilization of low sulfur, high wax content residual fuel oils.

As is well known, air pollution has many contributing causes. One of these is the relatively high amount of sulfur dioxide contained in stack gases resulting from heavy residual fuel oil combustion at industrial plants such as utility power plants. Recognition of this cause has led to regulations concerning the sulfur content of heavy residual fuel oils in the United States and in some European countries. To comply with these regulations, fuel oil producers are employing low sulfur, high pour, waxy crudes, particularly those produced in the North African oil fields. The main problem confronting the use of these waxy crudes is their high pour point, that is, of the order of 80° to 100°F. and higher.

In order to render these residual fuel oils feasible for transport and use, pour points of the order of about 50°F. and less, preferably less than 30°F., are required. This reduction in pour point is often accomplished through the use of pour depressors. However, many of the pour depressors which are effective in non-waxy fuels, for example, copolymers of dodecyl and octadecyl methacrylates and interpolymeric polymers of alkyl acrylates wherein a substantial portion of the alkyl groups, i.e., greater than about 35%, containing more than 24 and less than 20 carbons and/or are branched chain are relatively ineffective. Thus, there is a continuing need in this area for the finding of low cost pour depressors that are significantly effective in lowering the pour point of high pour waxy residual fuels.

SUMMARY OF INVENTION

I have discovered and this constitutes my invention a novel interpolymeric poly(n-alkylacrylate) of relatively low cost which effectively reduces the pour point of waxy residual fuels. My invention also encompasses waxy residual fuel compositions containing said polyacrylates. Further, I have found the need for introducing the polyacrylates in the residual fuel oil compositions contemplated herein at a temperature above the solution point of the wax component.

DETAILED DESCRIPTION OF THE INVENTION

The interpolymeric poly(n-alkylacrylates) contemplated herein are of a molecular weight between about 3000 and 100,000, preferably between 4000 and 52,000, most preferably between 15,000 and 35,000, said alkyl being of at least 18 carbons and at least 70 wt. % of said alkyl is between 20 to 24 carbons inclusively, the $C_{20}$ to $C_{24}$ alkyl group consisting of between about 2 and 65 wt. % $C_{20}$ alkyl, between about 18 and 65 wt. % $C_{22}$ alkyl, and between about 8 and 35 wt. % $C_{24}$ alkyl.

The interpolymers are derived from standard polymerization techniques such as polymerizing the alkyl acrylate monomers in the presence of acrylate polymerization catalyst, e.g., azo catalysts such as azobisisobutronitrile of U.S. Pat. No. 2,471,959 or the well known peroxide catalysts such as benzoyl peroxide and lauroyl peroxide utilizing catalyst quantities of between about 0.1 to 5 wt. %. Polymerization is normally conducted at a temperature between about 50 and 150°F., preferably at 80° to 100°C., utilizing a nitrogen blanket to prevent oxidation and azobisisobutronitrile catalyst. During polymerization normally periodic sampling is taken for refractive index (RI) determination. The polymerization reaction is continued until the refractive index remains relatively steady. The reaction time is normally between about 1 and 10 hours.

The n-alkylacrylate monomers from which the poly(n-alkylacrylate) interpolymeric products are derived are prepared by standard esterification techniques through the reaction of acrylic acid with n-alkanol mixtures wherein the reactive n-alkanols in said mixtures have at least 18 carbons and at least about 70 wt. % of the n-alkanol portion is of from 20 to 24 carbon atoms, the $C_{20}$ to $C_{24}$ group consisting of between about 2 and 65 wt. % eicosanol, between about 18 and 65 wt. % docosanol, and between about 8 and 35 wt. % tetracosanol. One suitable source of alcohol mixtures are the alcohols sold under the tradename "Alfols" by Continental Oil Co. "Alfols" are impure mixtures containing as the major portion, i.e., greater than 50 wt. % n-alkanols of various chain lengths, the remainder consisting of hydrocarbon, ketones and hindered unreactive alcohols. Typical analysis of two suitable examples of the "Alfol" alcohols are as follows:

| Typical Properties | Alfol 20+R | Alfol 22+R |
|---|---|---|
| Approx. homolog distribution 100% alcohol basis, wt. % | | |
| $C_{18}$ | 2 | 1 |
| $C_{20}$ | 60 | 5 |
| $C_{22}$ | 20 | 60 |
| $C_{24}$ | 10 | 21 |
| $C_{26}$ | 5 | 9 |
| $C_{28(+)}$ | 3 | 4 |
| Alcohol Content, approx. | 70 | 60 |
| Hydroxyl No. | 123 | 90 |
| Hydroxyl No., 100% alcohol basis | 176 | 150 |
| Sap. No. | 3 | 6 |
| $I_2$ No. | 12 | 13 |
| Carbonyl, % (as C = O) | 0.2 | 0.3 |
| Melting range, °F. | 113–135 | 113–136 |
| Color, Gardner | 12 | 18 |

The use of alcohol as defined to produce the polyacrylate with the n-alkyl group ranges as set forth is material to the effectiveness of the pour depressor in the waxy residuum compositions contemplated herein. If the alcohol employed is not within the contemplated chain lengths and/or of substantial branch chain structure, polyacrylates are produced outside the defined limitations and are either ineffective or relatively ineffective in depressing the pour of the defined waxy fuels.

A standard means of acrylate monomer precursor preparation is reacting (esterifying) the alochol mixture with acrylic acid in the presence of an esterification catalyst such as p-toluenesulfonic acid and a polymerization inhibitor, e.g., hydroquinone, desirably in the presence of an azeotroping agent for water by-product removal such as benzene. The esterification is conducted, for example, at a temperature of between about 190° and 200°F. and is continued until the amount of water by-product is removed as overhead indicates that the esterification is essentially complete.

In regard to the waxy residual fuel compositions of the invention, the wax containing residual heavy fuel oil bases contemplated herein contain a percentage of residual components as opposed to no residual components in distillate fuels. The contemplated petroleum residual components normally have a pour point up to 100°F. or more and macrocrystalline paraffin wax content of the order of between 4 and 35 wt. %. The amount of residual components in the base fuel compositions contemplated herein may vary in wide limits, e.g., up to 100 volume % but are normally between about 25 and 75 volume % of the total fuel quantity. The residual components may be obtained as a residue in the distillation of crude oil at temperatures between about 400° and 1050°F. either under atmospheric or reduced pressure (e.g., between about 15 and 760 mm Hg) and may be obtained as residues obtained from thermal or catalytic cracking processes. As residues these products are normally of such a high wax content, i.e., greater than 15 wt. %, that the addition of pour depressor is not effective in lowering pour point thereof to a desired level. Therefore, it is necessary to cut these waxy residuum stocks with petroleum cutter stocks such as a low wax (1–10 wt. %) petroleum residuum or petroleum distillates having a boiling point between about 300° and 850°F. such as gas oils and flash distillates. These cutter stocks (if used) are present in sufficient quantities to insure a macrocrystalline paraffin wax content in the final product of between 4 and 15 wt. %, preferably between 5 and 10 wt. %. The cutter stocks normally constitute between about 25 and 75 volume % of the final composition.

The concentration in which the polyacrylates are incorporated in the waxy residual fuel oil base will be widely varied since it is dependent on the nature and the quality of the residual fuel oil and the degree of pour depressing required. Pour depressing effect is sometimes evidenced in amounts as small as about 0.01 wt. % and quantities up to 2 wt. % are usually sufficient. Desirably, the waxy residual fuel oils contain between about 0.04 and 0.5 wt. % polyacrylates. To facilitate blending of the polyacrylate into the residual fuels, the polyacrylate may be diluted with a solvent such as light gas oil of a kinematic viscosity (cs.) of between about 2 and 4 at 100°F. to form a between about 10 and 50 wt. % polyacrylate lube oil concentrate.

In the compounding of the waxy fuel oil compositions of the invention, it is essential that the polyacrylate pour depressor be introduced into the residual fuel at a temperature above the solution point of the macrocrystalline paraffin wax component. Usually, a temperature of about 200°F. or more is required. If the polyacrylate is contacted with the wax component at a temperature substantially below the solution point of a substantial portion of the wax, there is little or no pour depressing effect afforded by the polyacrylate.

In formulating the compositions of the invention, if a non waxy cutter stock is employed, the polyacrylate is preferably first mixed with the cutter stock, desirably at an elevated temperature, e.g., between about 100° and 150°F. and the polyacrylate-distillate mixture is in turn mixed with the wax containing residuum fuel component at a temperature above the solution point of the wax component, e.g., 200°F. Alternatively, the poly(alkylacrylate) may be blended in the waxy residual base fuel in its entirety at a temperature above the solution point of the wax component followed by the addition of the cutter stock.

The following examples further illustrate the product and composition of the invention but are not to be construed as limitations thereof.

EXAMPLE I

This example illustrates the manufacture of the poly(n-alkylacrylate) pour point depressors.

Monomer Precursor Synthesis

Monomeric alkyl acrylate of three alcohols were prepared. Alcohols A and B are within the scope of the invention and Alcohol C is included for comparative purposes. These alcohols were of the following compositions:

| Typical Properties | Alcohol A | Alcohol B | Alcohol C |
|---|---|---|---|
| Approx. homolog distribution 100% alcohol basis, wt. % | | | |
| $C_{18}$ | 5 | 0 | 6 |
| $C_{20}$ | 39 | 12 | 26 |
| $C_{22}$ | 27 | 47 | 21 |
| $C_{24}$ | 14 | 21 | 17 |
| $C_{26}$ | 7 | 10 | 12 |
| $C_{28}$ | 3 | 5 | 8 |
| $C_{30}$ (+) | 5 | 5 | 5 |
| $C_{32}$ (+) | — | — | 5 |
| Alcohol Content, wt. % | 70 | 60 | 67* |
| Hydroxyl No. | 123 | 90 | 92 |
| Hydroxol No., 100% alcohol basis | 176 | 90 | 137 |
| Sap. No. | 3 | 6 | 10 max. |
| $I_2$ No. | 12 | 13 | 15 max. |
| Carbonyl, % (as C = O) | 0.2 | 0.3 | 0.1 |
| Melting Range, °F. | 113–135 | 113–136 | 113–122 |
| Color, Gardner | 12 | 18 | 400–600 |

*Approx. 33% normal, 34% branched

The charge materials in the monomer process are as follows:

| Material | Wt. (g) | Moles |
|---|---|---|
| Hydroquinone | 2 | 0.02 |
| p-Toluene sulfonic acid | 5.6 | 0.036 |
| Alcohol A (Run 1) | 952 | 2 |
| Alcohol B (Run 2) | 1245 | 2 |
| Alcohol C (Run 3) | 1220 | 2 |
| Acrylic acid, glacial | 144 | 2 |
| Benzene | 536 | — |

All the above charge except the acrylic acid was melted together under nitrogen at about 60°C. (140°F.). The acrylic acid was then added with stirring and the mixture brought to reflux, with a pot temperature of about 90°C. (194°F.). Nitrogen was introduced below the surface of the liquid reaction mixture at a rate of between about 40 and 45 mls./minute as the water of reaction was azeotroped off at a reflux rate of 4 mls./minute. About 96% of the theoretical amount of water was removed in 12 hours and all the water was removed in 21 hours. Benzene was removed by stripping the product to 15 mm Hg pressure at a pot temperature of about 160°C. (320°F.).

Physical data for the monomer products were as follows:

| Physical Data For Monomer | Mono-Acrylate A | Mono-Acrylate B | Mono-Acrylate C |
|---|---|---|---|
| Sap. No. | 115 | 95 | 88 |
| Neut. No. | 1.3 | 1.1 | 1.05 |
| Hydroxyl No. | 8 | 14 | 10 |
| Sp. Grav. 150°F./60°F. | 0.8316 | 0.8310 | 0.8215 |
| Refractive Index | 1.4450 | 1.4465 | 1.4461 |
| Kin. Visc., cs. | | | |

-continued

| Physical Data For Monomer | Mono-Acrylate A | Mono-Acrylate B | Mono-Acrylate C |
|---|---|---|---|
| 150°F. | 7.39 | 8.84 | 8.57 |
| 210°F. | 3.90 | 4.50 | 4.48 |
| Dialysis Residue, % | <3 | <3 | <3 |
| Melting Point, °C. | 36 | 38 | 37 |

Polymer Synthesis

The monomers produced above were subjected to polymerization to form their respective poly(n-alkylacrylate) pour depressant products. The procedure employed was as follows:

In three separate runs 200 grams of monomer were heated to 85°C. (185°F.) over a 20 minute period under prepurified nitrogen introduced into the reaction system at a rate of 120 mls./minute. The nitrogen flow was then reduced to 40 mls./minute and 4 grams of azobisisobutronitrile were added. The reaction mixture was stirred and readings of the refractive index of the mixture were taken at ½ hour intervals, and the reaction was continued until the refractive index is constant, that is ± 3 units in the fourth decimal place. The total reaction time required was about 3 hours.

The product was cooled and analyzed and the resultant polyacrylates gave the following analysis:

| Physical Data (Av. Value) | Poly-Acrylate A | Poly-Acrylate B | Poly-Acrylate C |
|---|---|---|---|
| RI at 54°C. | 1.4545 | 1.4540 | 1.4540 |
| Sp. Grav., 150°F./60°F. | 0.8580 | 0.8495 | 0.8408 |
| Melting Point, °C. | 47 | 48 | 39 |
| Kin. Visc., cs | | | |
| 150°F. | 196 | 115 | 126.9 |
| 210°F. | 81 | 49 | 55.3 |
| Dialysis, % Residue | 55 | 48 | 42.7 |
| Mole wt. of Residue | 23,000 | 20,000 | 29,000 |

Polyacrylate-Oil Concentrate

The resultant polyacrylate products were diluted with a light hydrocarbon oil having a pour point of about 0°F. and a kinematic viscosity at 100°F. of about 3 to form a 25 wt. % concentrate solution of the polyacrylate.

Typical tests on the 25 wt. % polyacrylate containing concentrate were as follows:

| Physical Test | Poly-Acrylate A Concentrate | Poly-Acrylate B Concentrate | Poly-Acrylate C Concentrate |
|---|---|---|---|
| Pour Point | 75 | 75 | 75 |
| Kin. Visc., cs., | | | |
| 100°F. | 10.53 | 11.92 | 11.5 |
| 210°F. | 3.38 | 3.85 | 3.8 |
| Gravity, °API | 28.5 | 29.7 | 29.0 |

EXAMPLE II

This example illustrates the pour depressant effect of representative examples of polyacrylates of the invention (A and B) and comparative Polyacrylate C.

The fuel oil employed was a heavy waxy residual fuel oil comprising 50 vol. % macrocrystalline wax containing vacuum petroleum residuum of 50 vol. % non-waxy hydrotreated gas oil having a boiling point of between about 400°-652°F., an API gravity of 35.3 and a pour point of about −5°F. The resultant base fuel composition had the following properties:

| Physical Tests | Results |
|---|---|
| Pour Point, °F. | 85 |
| Wax content, wt. % | 12.7 |
| SUS Visc. at 150°F. | 70.2 |
| API°, Gravity | 24.1 |
| Wt. % Sulfur | 0.18 |

In the preparation of the polyacrylate containing residual fuel compositions the following procedure was employed.

The petroleum vacuum residuum component was heated to 200°F. with stirring for ½ hour during which time the polyacrylates prepared in Example I were added. Subsequently, the hydrotreated gas oil was blended into the mixture at 150°F. followed by stirring at 155°F. for an additional 0.5 hour. The effectiveness of the three polyacrylates (PAA) (representative A and B, comparative C) produced in Example I in depressing the pour point of the waxy residual fuel is set forth below in the following table:

| PAA, Wt. % In Fuel | Poly-Acrylate A | Pour Point, °F. Poly-Acrylate B | Poly-Acrylate C |
|---|---|---|---|
| 0.07 | 25 | 30 | 80 |
| 0.06 | 25 | 50 | 80 |
| 0.05 | 35 | 50 | 70 |
| 0.04 | 55 | 70 | 80 |
| 0.03 | 70 | 70 | 75 |
| 0.02 | 85 | 85 | 85 |
| 0.01 | 85 | 85 | 80 |
| 0 | 85 | 85 | 85 |

EXAMPLE III

This example illustrates the criticality of introducing the polyarcylate pour depressor at a temperature above the solution point of the wax component of the base fuel.

The waxy residual base fuel (BF) was that described in Example II and the polyacrylate (PAA) was the Poly-Acrylate A prepared in Example I. Two blending runs were made. Run 1 representative of the invention and Run 2 is a comparative blending technique.

In the blending of the poly(n-alkylacrylate) in the residual fuel in representative Run 1 the Polyacrylate A was blended into the fuel in accordance with the procedure outlined in Example II, i.e., introduction of the polyacrylate into the wax containing vacuum residuum at 200° followed by the addition of the gas oil component of the residual fuel at 150° further followed by stirring the resultant mixture at 135°F.

In comparative Run 2 the Polyacrylate A was introduced into the gas oil fraction at 200°F. and then the wax containing vacuum residuum componet was blended to the resultant mixture at 150°F. which is substantially below the solution temperature of the wax ingredient. The blend was stirred at 135°F. The test data and results are reported below:

| Description | Pour Point, °F. |
|---|---|
| Base Fuel (BF) | 85 |
| BF + 0.1 wt. % PAA (Run 1) | 30 |

| Description | Pour Point, °F. |
|---|---|
| BF + 0.1 wt. % PAA (Run 2) | 80 |

EXAMPLE IV

This example illustrates the selectivity of the polyacrylate (PAA) in respect to base fuels to be an effective pour depressant and also the materiality of blending the polyacrylate into the residual fuel above the solution point of the macrocrystalline paraffin wax component.

Three base fuel compositions were tested to determine the pour depressant effect of the Polyacrylate A prepared in Example I. The first fuel tested designated as BF-4 which is a 650+°F. (atm. pressure) petroleum residuum of a North African crude oil. This residue has a wax content of 16.8 wt. %. The next base fuel tested was designated as BF-6 which is a 650+°F. (atm. pressure) residuum of an Arabian crude oil which is a macrocrystalline paraffin wax content of about 2 wt. %. The third blend tested is a 60/40 volume % blend of BF-4 and BF-6 which are the waxy residual heavy fuel oil bases contemplated herein having a wax content of 13 wt. % and a SUS viscosity at 150°F. of 590. The 60 BF-4/40 BF-6 base fuel compositions within the scope of the invention. BF-4 and BF-6 fuels are individually outside of said scope. The test data and results are reported below:

| Blend | Pour Point, °F. |
|---|---|
| BF-4 | 100 |
| BF-6 | 25 |
| 60 vol. % BF-4/BF-6 | 85 |
| BF-4 + 0.1 wt. % PAA | 95 |
| BF-6 + 0.1 wt. % PAA | 25[(a)] |
| 60 vol. % BF-4/40 vol. % BF-6 + 0.1 PAA[(a)] | 85[(b)] |

[(a)]PAA blending temp. 200°F.-above wax solution point
[(b)]PAA blending temp. 125°F.-below wax solution point

EXAMPLE V

This example illustrates the ineffectiveness of other analogous polymeric materials in depressing the pour point of waxy residual petroleum fuel.

The base fuel (BF) was that described in Example II. The pour depressors tested were Polyacrylate A and Polyacrylate B prepared in Example I. Further, a comparative pour depressor was employed and was designated as Poly-Methacrylate D. Poly-Methacrylate D is a copolymer of lauryl and octadecyl methacrylate copolymerized in a weight ratio of 4:1 and having an intrinsic viscosity in benzene at 77°F. of about 0.58. The test data and results are reported below:

| Description | Pour Point, °F.[(a)] |
|---|---|
| BF | 85 |
| BF + 0.1 wt. % Poly-Methacrylate D | 85 |
| BF + 0.07 wt. % Poly-Acrylate A | 25 |
| BF + 0.07 wt. % Poly-Acrylate B | 30 |

[(a)]depressor blending at 200°F.

I claim:

1. An interpolymeric poly(n-alkylacrylate) of a molecular weight between about 3000 and 100,000 wherein said n-alkyl is at least 18 carbons and wherein at least 70 wt. % of said n-alkyl is of from 20 to 24 carbons consisting of between about 2 and 65 wt. % $C_{20}$ alkyl, between about 18 and 65 wt. % $C_{22}$ alkyl, and between about 8 and 35 wt. % $C_{24}$ alkyl.

2. An interpolymeric poly(n-alkylacrylate) of claim 1 wherein said alkyl is about 39 wt. % $C_{20}$, about 27 wt. % $C_{22}$ and about 14 wt. % $C_{24}$.

3. An interpolymeric poly(n-alkylacrylate) of claim 1 wherein said alkyl is about 12 wt. % $C_{20}$, about 47 wt. % $C_{22}$ and about 21 wt. % $C_{24}$.

* * * * *